United States Patent
Garrick et al.

(10) Patent No.: US 11,764,421 B2
(45) Date of Patent: Sep. 19, 2023

(54) METHOD AND SYSTEM FOR A BATTERY CELL

(71) Applicant: GM GLOBAL TECHNOLOGY OPERATIONS LLC, Detroit, MI (US)

(72) Inventors: Taylor R. Garrick, Royal Oak, MI (US); Yiling Dai, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 336 days.

(21) Appl. No.: 17/149,137

(22) Filed: Jan. 14, 2021

(65) Prior Publication Data

US 2022/0223936 A1  Jul. 14, 2022

(51) Int. Cl.
*H01M 10/63* (2014.01)
*H01M 10/0525* (2010.01)
*H01M 10/615* (2014.01)
*H01M 10/647* (2014.01)
*H01M 10/6572* (2014.01)
*H01M 10/48* (2006.01)
*H01M 10/625* (2014.01)

(52) U.S. Cl.
CPC ....... *H01M 10/63* (2015.04); *H01M 10/0525* (2013.01); *H01M 10/482* (2013.01); *H01M 10/615* (2015.04); *H01M 10/625* (2015.04); *H01M 10/647* (2015.04); *H01M 10/6572* (2015.04); *H01M 2250/20* (2013.01)

(58) Field of Classification Search
CPC .. H01M 10/63; H01M 10/615; H01M 10/625; H01M 10/647; H01M 10/6572; H01M 10/0525; H01M 10/482
See application file for complete search history.

(56) References Cited

U.S. PATENT DOCUMENTS 11,267,365 B2 * 3/2022 Kumaraswamy ... H01M 10/667

OTHER PUBLICATIONS

C. Speltino, D. Di Domenico, G. Fiengo and A. Stefanopoulou, "Comparison of Reduced Order Lithium-Ion Battery Models for Control Applications", 6 pages.

(Continued)

*Primary Examiner* — Karie O'Neill Apicella
(74) *Attorney, Agent, or Firm* — Quinn IP Law

(57) ABSTRACT

A method, apparatus, and control system for a battery cell include a heat exchanger in thermal contact with the battery cell, and a first controller. The first controller connects to the heat exchanger, and monitors the battery cell. The first controller includes a reduced order electrochemical model, a heat generation model, and a heat generation controller. The first controller determines a target parameter for the battery cell, and determines battery cell parameters. The reduced order electrochemical model determines internal ROM variables based upon the battery cell parameters. The heat generation model determines an electrochemical heat generation parameter from the battery cell based upon the internal ROM variables and the target parameter for the battery cell. The heat generation controller determines a heat work parameter based upon the electrochemical heat generation and the target parameter for the battery cell. The heat exchanger is controlled based upon the heat work parameter.

20 Claims, 2 Drawing Sheets

(56) References Cited

OTHER PUBLICATIONS

Nur Hazima Faezaa Ismail, Siti Fauziah Toha, Nor Aziah Mohd Azubir, Nizam Hanis MD Ishak, Mohd Khair Hassan, Babul Salam KSM Ibrahim, "Simplified Heat Generation Model for Lithium ion battery used in Electric Vehicle", IOP Conference Series Materials Science and Engineering, Dec. 2013, 7 pages.

Minseok Song, Yang Hu, Song-Yul Choe and Taylor R. Garrick, "Analysis of the Heat Generation Rate of Lithium-Ion Battery Using an Electrochemical Thermal Model", 2020 J. Electrochem. Soc. 167 120503, 2020, 14 pages.

* cited by examiner

METHOD AND SYSTEM FOR A BATTERY CELL

INTRODUCTION

DC power sources, such as batteries, are electrochemical devices that may be employed to store and release electric power that may be employed by an electric circuit or an electric machine to perform work, such as for communications, display, or propulsion. Heat may be generated by the processes of converting electric power to chemical potential energy, i.e., battery charging, and converting chemical potential energy to electric power, i.e., battery discharging.

A lithium ion battery is an electrochemical device that operates by reversibly passing lithium ions between a negative electrode (or anode) and a positive electrode (or cathode). The negative and positive electrodes are situated on opposite sides of a porous polymer separator that is soaked with an electrolyte solution suitable for conducting lithium ions. Each of the negative and positive electrodes is also accommodated by a respective current collector. The current collectors associated with the two electrodes are connected by an interruptible external circuit that allows an electric current to pass between the electrodes to electrically balance the related migration of lithium ions. Further, the negative electrode may include a lithium intercalation host material, and the positive electrode may include a lithium-based active material that can store lithium ions at a higher electric potential than the intercalation host material of the negative electrode.

Operating a DC power source such as a lithium ion battery outside of a desired temperature range may reduce battery service life. By way of example, lithium-ion technology may require operation within a temperature range between 20 C and 35 C to maximize service life of the battery. Operation of the lithium ion battery outside of this temperature range may accelerate aging of the battery, reduce the service life of the battery, and/or reduce the energy storage capacity thereof.

There is a need to dynamically and accurately control one or more parameters related to a battery cell, or a battery cell pack containing multiple battery cells, during charging and/or discharging in order to mitigate effects of excess temperature on aging, service life, and/or energy storage capacity.

SUMMARY

The concepts described herein include a method, apparatus, and control system to dynamically control a battery cell or a plurality of battery cells to a constant setpoint, e.g., to one of a constant temperature setpoint, a constant current setpoint, or a constant voltage setpoint using a novel combination or arrangement of reduced order electrochemical models, reduced order thermal models, feedback control, model predictive control, and feed-forward control to control a heat exchanger such as a heat pump. The control of a battery cell or a plurality of battery cells to a constant setpoint is advantageously dynamically achieved during charging and discharging events.

A method, apparatus, and control system for a battery cell are set forth, and include a heat exchanger in thermal contact with the battery cell, and a first controller. The first controller is operatively connected to the heat exchanger, and is arranged to monitor the battery cell. The first controller has executable code including a reduced order electrochemical model, a heat generation model, and a heat generation controller and includes an instruction set that is executable to determine a target parameter for the battery cell, and determine a plurality of battery cell parameters. The reduced order electrochemical model determines a plurality of internal ROM variables based upon the plurality of battery cell parameters. The heat generation model determines an electrochemical heat generation parameter from the battery cell based upon the plurality of internal ROM variables and the target parameter for the battery cell. The heat generation controller determines a heat work parameter based upon the electrochemical heat generation and the target parameter for the battery cell. The heat exchanger is controlled based upon the heat work parameter.

An aspect of the disclosure includes the first controller including a model parameter modification routine that is executable to update, via the model parameter modification routine, the plurality of battery cell parameters.

Another aspect of the disclosure includes the heat exchanger that is in thermal contact with the battery cell being a thermoelectric heat pump device.

Another aspect of the disclosure includes the battery cell being a rectangular prismatic device, wherein the heat exchanger in thermal contact with the battery cell includes a first thermoelectric heat pump device in thermal contact with a first side of the rectangular prismatic device and a second thermoelectric heat pump device in thermal contact with a second side of the rectangular prismatic device.

Another aspect of the disclosure includes the target parameter for the battery cell being a target temperature value.

Another aspect of the disclosure includes the target parameter for the battery cell being a target current value.

Another aspect of the disclosure includes the target parameter for the battery cell being a target voltage value.

Another aspect of the disclosure includes the instruction set being executable in real-time to determine, via the heat generation controller, the heat work parameter based upon the electrochemical heat generation and the target parameter for the battery cell and control the heat exchanger based upon the heat work parameter.

Another aspect of the disclosure includes the first controller having an instruction set that is executable to control the heat exchanger to control a temperature of the battery cell based upon the heat work parameter.

Another aspect of the disclosure includes a thermal management controller in communication with the first controller and operatively connected to the heat exchanger, wherein the first controller includes an instruction set that is executable to control the thermal management controller to operate the heat exchanger based upon the heat work parameter.

Another aspect of the disclosure includes the battery cell being a rechargeable lithium-ion battery cell.

Another aspect of the disclosure includes the battery cell being a plurality of battery cells that are electrically connected.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

A lithium ion battery generally operates by reversibly passing lithium ions between a negative electrode (sometimes called an anode) and a positive electrode (sometimes called a cathode). The negative and positive electrodes are situated on opposite sides of a porous polymer separator that is soaked with an electrolyte solution suitable for conducting lithium ions. Each of the negative and positive electrodes is also accommodated by a respective current collector. The current collectors associated with the two electrodes are connected by an interruptible external circuit that allows an electric current to pass between the electrodes to electrically balance the related migration of lithium ions. Further, the negative electrode may include a lithium intercalation host material, and the positive electrode may include a lithium-based active material that can store lithium ions at a higher electric potential than the intercalation host material of the negative electrode.

Electric vehicles and hybrid vehicles include a battery pack to supply power to drive one or more wheels of the vehicle during certain modes of operation. The battery pack may include a module that houses a battery formed of a plurality of cells. The battery pack may include a cooling plate that is configured to cool the cells of the battery pack Note that the specific mechanisms or techniques for cooling the battery shown and discussed herein are not limiting, and that other structures and mechanisms may be used. For example, and without limitation, thermoelectric devices, dedicated coolant loops, air cooling, or combinations thereof, may be used for the methods of selectively cooling the battery discussed herein.

Figure 1:
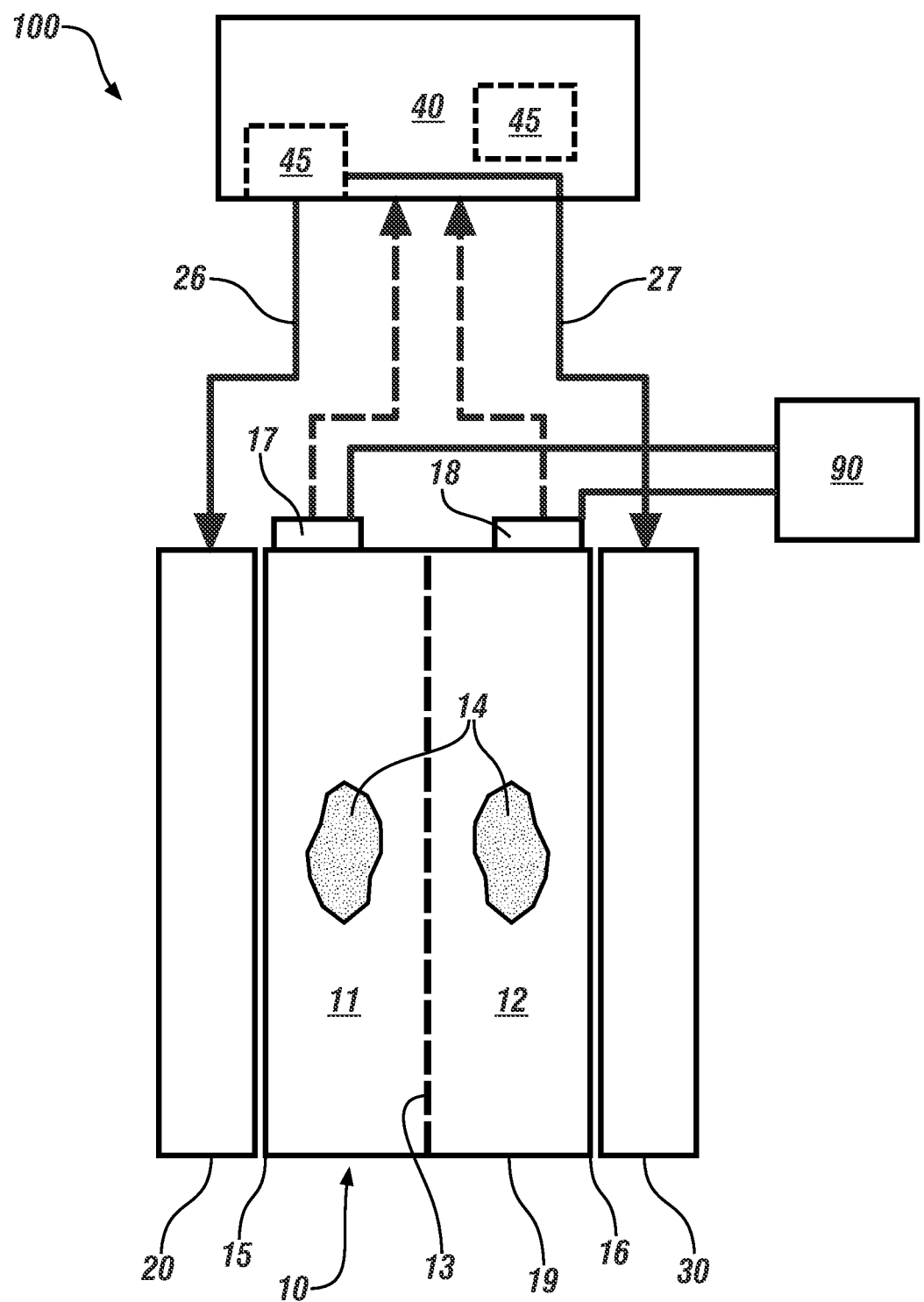
FIG. 1 schematically illustrates a battery cell and a related control system, in accordance with the disclosure.
Figure 2:
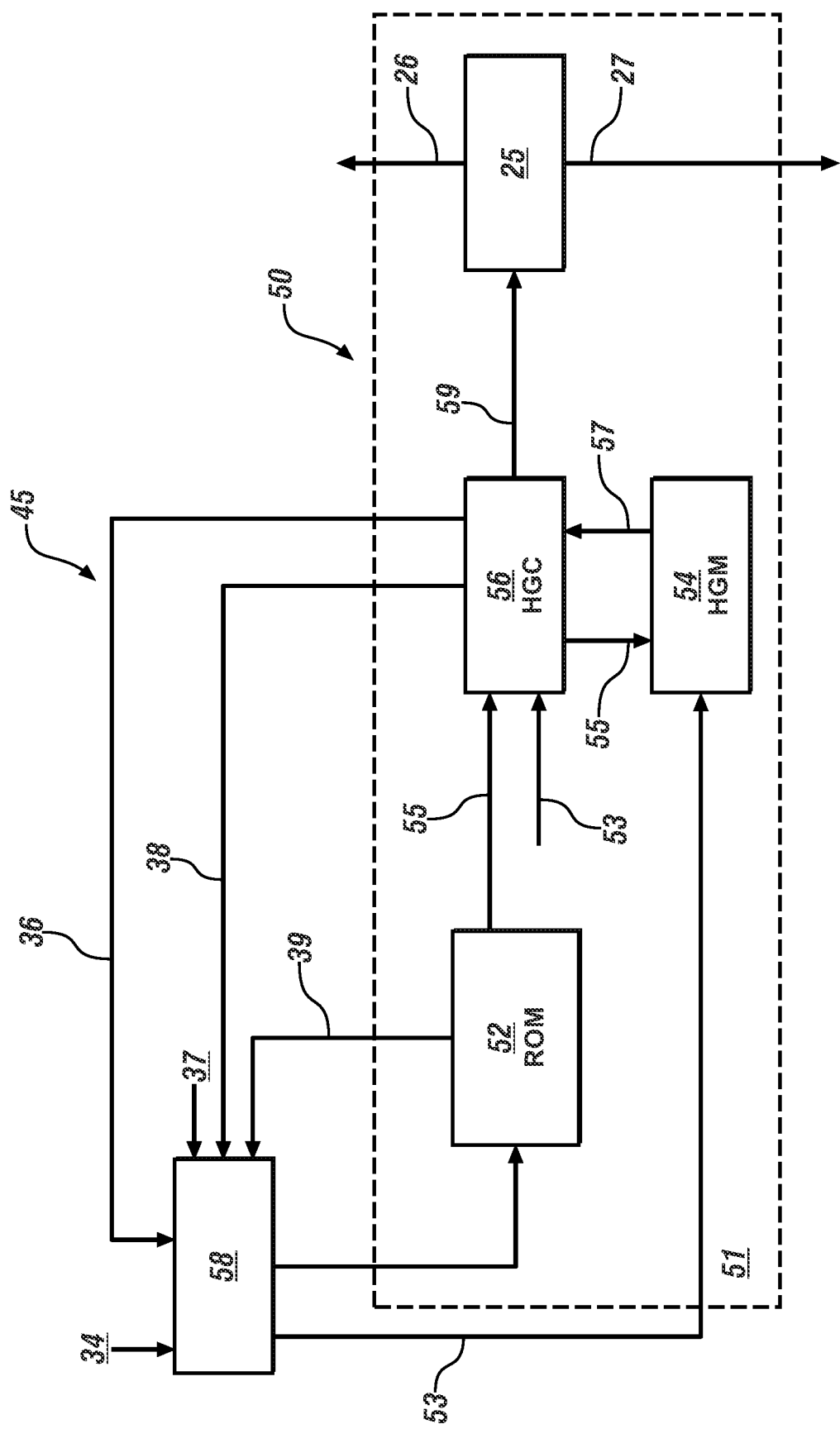
FIG. 2 schematically illustrates, in block diagram form, a control system for a battery cell and/or a battery pack, in accordance with the disclosure.

Referring to the drawings, wherein like reference numerals correspond to like or similar components, FIGS. 1 and 2, consistent with embodiments disclosed herein, schematically illustrate an embodiment of a battery cell 10 and associated control system 100. The battery cell 10 includes an anode 11, cathode 12, separator 13, electrolyte solution 14, anode collector 17, and cathode collector 18, which are enclosed in a case 19. In one embodiment, and as shown, there is a first surface 15 that is proximal to the anode 11, and a second surface 16 that is proximal to the cathode 12. In one embodiment, the case 19 is configured as a rectangular prismatic device, and the battery cell 10 is configured as pouch-type element. Alternatively, the battery cell 10 may be configured as a cylindrical device. During a discharge process, the lithium active particles diffuse up to a surface of the cathode where they react, producing lithium ions that flow through the electrolyte solution via diffusion and migration until they arrive at the cathode. The positively charged ions react with the metal oxide material particles of the anode and diffuse within it. The electrons produced in the cathode reaction cannot flow through the electrolyte solution that acts as insulator and flow through an external circuit, producing electrical current. The inverse reactions occur during a charge process. The anode collector 17 and cathode collector 18 are electrically connected to an electrically-powered device 90 that utilizes the electric power stored on the battery cell 10. Battery cell parameters 37 include voltage, current, temperature, etc.

The electrically-powered device 90 may be a rotary electric motor or electric motor/generator, a display device, a communication device, etc., that is configured to utilize the electric power stored on the battery cell 10. The electrically-powered device 90 also includes, in one embodiment, connectivity to an electrical charging system (not shown). Operating parameters of the electrically-powered device 90 relate to electrical system loads associated with charging and/or discharging, and may include positive and/or negative voltage level(s), positive and/or negative current level(s), temperature, etc.

The battery cell 10 is a stand-alone device in one embodiment, and is electrically connected to the electrically-powered device 90.

Alternatively, the battery cell 10 may be an element of a battery pack that is composed of a plurality of the battery cells 10 that are electrically connected, such as a battery pack for an electrically powered vehicle. The concepts described herein may be advantageously employed on various battery cell configurations and also on various battery pack configurations.

The control system 100 for the battery cell 10 includes a controller 40. The controller 40 is arranged to monitor the battery cell 10, and includes, in one embodiment, input leads to the anode collector 17 and the cathode collector 18 for monitoring parameters of the battery cell 10 and the electrically-powered device 90.

The controller 40 also includes a non-transitory digital data storage medium on which a control routine 45 is stored in one or multiple encoded datafiles that are executable by a processor of the controller 40. An embodiment of the control routine 45 is described with reference to FIG. 2.

The control system 100 for the battery cell 10 also includes one or multiple heat exchangers that are in thermal contact with the battery cell 10 to effect heat transfer. In one embodiment, and as shown, a first controllable heat exchanger 20 is proximal to and in thermal contact with the first surface 15, and a second controllable heat exchanger 30 is proximal to and in thermal contact with the second surface 16. The first and second controllable heat exchangers 20, 30 may be heat pump devices in one embodiment, such as a thermoelectric device that operates in accordance with the Peltier effect. Alternatively, first and second controllable heat exchangers 20, 30 may be one or multiple controllable devices, such as an air-air heat exchanger employing a controllable fan, a dedicated coolant loop, etc.

FIG. 2 schematically illustrates an embodiment of the control routine 45 that is arranged to monitor operation of the battery cell 10 and control operations of the first and second controllable heat exchangers 20, 30 in response to a target parameter Z. The control routine 45 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For convenience and clarity of illustration, the control routine 45 is described with reference to the control system 100 shown in FIG. 1.

The control routine 45 includes a model predictive controller (MPC) 50 and a model parameter modification routine 58. The MPC 50 has a Reduced Order electrochemical Model (ROM) 52, a Heat Generation Model (HGM) 54 and a Heat Generation Controller (HGC) 56. The Heat Generation Controller 56 communicates with a thermal management controller 25, which is operatively and/or operatively and signally connected to the first and second controllable heat exchangers 20, 30 (as shown), or alternatively, operatively and/or operatively and signally connected to a single heat exchanger.

The model parameter modification routine 58 is employed to manage uncertainty associated with a plurality of battery cell parameters 51 to the ROM 52, including managing, updating and otherwise improving their accuracy employing control and feedback terms that include a target parameter ($Z_{target}$) 34 for the battery cell 10; an error term ($Z_{error}$) 36 associated with the target parameter ($Z_{target}$) 34; battery cell parameters 37 including voltage, current, temperatures, etc.; surface temperature estimate(s) 38 of the surface temperature(s) of the battery cell 10; and, voltage and current estimates 39 for the battery cell 10. The control or target parameter ($Z_{target}$) 34 for the battery cell may be a target temperature, a target current, a target voltage, or another controllable parameter. The error term ($Z_{error}$) 36 is associated with the target parameter ($Z_{target}$) 34. The battery cell parameters 37 include voltage, current, temperatures, etc. The battery cell temperatures may include surface temperatures of the battery cell 10 at the interface(s) between the battery cell 10 and one or both of the heat exchanger(s) 20, 30, i.e., at one or both of the first surface 15 and the second surface 16, are employed in determining heat transfer effects. The surface temperature estimate(s) 38 include estimate(s) of the surface temperatures of the battery cell 10 at the interface(s) between the battery cell 10 and one or both of the heat exchanger(s) 20, 30, as determined by the heat generation controller 56. The voltage and current estimates 39 for the battery cell 10 are determined by the ROM 52.

The model parameter modification routine 58 may employ a Kalman filter or another form of linear quadratic estimation (LQE). The Kalman filter is an analytical construct that can be reduced to practice as an algorithm that uses a series of measurements observed over time, containing statistical noise and other inaccuracies, to produce estimates of unknown variables based upon the measurements that are observed over a period of time.

The model parameter modification routine 58 generates battery cell parameters 51 that are supplied to the ROM 52, including a state of charge (SOC), a state of health (SOH), a cell voltage ($V_{cell}$), a cell current ($A_{cell}$), and electrochemical parameters (EC Parameters). The model parameter modification routine 58 also generates an error term $Z_{target,error}$ 53 that is associated with the target parameter Z.

The ROM 52 provides a simplification of several high-fidelity, complex electrochemical source models that captures the behavior of the source models, facilitating understanding of the system's dominant effects using minimal computational resources.

The battery cell parameters 51 to the ROM 52 include the state of charge (SOC), the state of health (SOH), the cell voltage ($V_{cell}$), the cell current ($A_{cell}$), and electrochemical parameters (EC Parameters) that may be determined by regular and/or periodic monitoring of the battery cell parameters 37 by the controller 40. The ROM 52 includes a selection of reduced order methods for model components that are based upon physics (C1). A third-order polynomial method may be used for the liquid phase in the porous electrode, which allows use of a local concentration to calculate electrolyte diffusion and conductivity properties, rather than using an average concentration with the lower-order polynomial method. Moreover, accounting for non-uniform reaction in the porous domain may be maintained through the use of a third-order polynomial. This is important to capture the local behavior. A three-term polynomial approximation is used for the solid phase diffusion. This is suitable to capture the dynamic profile, i.e., charge/discharge/rest. A full order model may be implemented in embodiments when transient information is important. A solid phase potential is assumed constant for each electrode, which simplifies the physics without losing accuracy with the battery properties.

The ROM 52 further includes a compilation of reduced order methods for an efficient and workable solution, tailored for control and calibration development (C2). The resulting natural system equations based on the selection methods exist as a differential algebraic equation (DAE) system. The DAE system is reconstructed into a system of ordinary differential equations (ODEs), which makes it more robust to solve by different commercial system platforms by integrating the ROM with them.

The ROM 52 further includes improved algorithms for robustness and real-time simulation (C3), wherein certain partial differential equations (PDEs) are linearized and solved resulting in analytical solutions, which improves robustness and enables real-time simulation through eliminating the need of an inner iteration.

The ROM 52 determines the plurality of internal ROM variables ($ROM_{InternalVar}$) 55 based upon the plurality of battery cell parameters, which include, e.g., an open circuit voltage (OCV), reaction rate, a solid material balance, an overpotential related to phase change, etc. The internal ROM variables ($ROM_{InternalVar}$) 55 are provided as inputs to the heat generation controller 56 and to the HGM 54, and also as feedback to the model parameter modification routine 58.

Examples of the plurality of internal ROM variables 55 include, by way of non-limiting examples, cathode electrical conductivity, cathode particle size, cathode film resistance, cathode anodic transfer coefficient, cathode cathodic transfer coefficient, cathode length, cathode width, cathode thickness, cathode collector thickness, cathode porosity, cathode active material volume fraction, cathode equilibrium potential, cathode particle surface concentration, cathode particle average concentration, cathode overpotential, cathode voltage drop, cathode diffusivity, cathode factor for kinetic temperature dependence (e.g., Arrhenius). Example internal ROM variables further include, e.g., anode electrical conductivity, anode particle size, anode film resistance, anode anodic transfer coefficient, anode cathodic transfer coefficient, anode length, anode width, anode thickness, anode collector thickness, anode porosity, anode active material volume fraction, anode equilibrium potential, anode particle surface concentration, anode particle average concentration, anode overpotential, anode voltage drop, anode diffusivity, anode factor for kinetic temperature dependence e.g., Arrhenius). Example internal ROM variables further including, e.g., separator thickness, separator porosity, electrolyte ionic diffusivity, electrolyte ionic conductivity electrolyte salt concentration in anode domain, electrolyte salt concentration in cathode domain, electrolyte salt concentration in separator domain, full cell equilibrium potential, thermal conductivity of cell, heat capacity of cell, specific heat capacity of cell, thermal conductivity of cathode, specific heat capacity of cathode, TC of anode, SHC of anode, TC of separator, SHC of separator, terminal voltage, contact resistance at anode, contact resistance at cathode, tortuosity of anode, tortuosity of cathode, tortuosity of separator, Bruggeman coefficient for anode, Bruggeman coefficient for separator, Bruggeman coefficient for cathode, anode collector conductivity, cathode collector conductivity, capacity loss per cycle, lithium loss per cycle, lithium loss per calendar unit of time, capacity loss per calendar unit of time, resistance increase per cycle, and/or resistance increase per unit of time (also called calendar aging).

The operating temperature of the battery cell 10 strongly affects overall chemical reactions, ion transport, intercalation and deintercalation process, and consequently affects the efficiency, cycle life, and degradation of the battery cell 10. The HGM 54 is a thermal model that includes irreversible and reversible heat source terms, and the effects of C-rates and temperatures on a heat generation rate and an entropy coefficient that are generated during charging and discharging of the battery cell 10. Examples of simplified heat generation models for lithium-ion battery cells are available, and thus not described in detail herein. In operation, the HGM 54 dynamically determines an electrochemical heat generation parameter (Q) 57 that is specific to the battery cell 10 using thermodynamic energy balance based upon Joule heating and entropy changes, using the plurality of internal ROM variables ($ROM_{InternalVar}$) 55 and the error term $Z_{target,error}$ 53 that is associated with the target parameter Z.

The thermal management for battery systems may be optimally designed to achieve a highly efficient and reliable operation of the battery systems, which requires characterization and analysis of heat generated during operation. In one embodiment, the thermal model includes irreversible and reversible heat source terms is incorporated into the reduced-order electrochemical model (ROM). The model is validated against the heat generation rate of a large format pouch type lithium-ion battery measured by a developed calorimeter that enables the measurement of heat generation rate and entropy coefficient. In one embodiment, the model has been shown to in good agreement with measured heat generation rates up to 3 C from −30° C. to 45° C. The analysis includes the effects of C-rates and temperatures on the two heat source terms generated during charging and discharging.

The control routine 45 determines a target parameter ($Z_{target}$) for the battery cell 10, and determines a plurality of battery cell parameters, including voltage, current and temperature. In one embodiment, the target parameter ($Z_{target}$) for the battery cell 10 is a target temperature, and the control routine 45 monitors operation of the battery cell 10 and controls operations of the first and second controllable heat exchangers 20, 30 in response to achieve the target temperature. Alternatively, the target parameter ($Z_{target}$) for the battery cell is a target voltage, and the control routine 45 monitors operation of the battery cell 10 and controls operations of the first and second controllable heat exchangers 20, 30 in response to achieve the target voltage. Alternatively, the target parameter ($Z_{target}$) for the battery cell is a target current, and the control routine 45 monitors operation of the battery cell 10 and controls operations of the first and second controllable heat exchangers 20, 30 in response to achieve the target current.

In operation, the control routine 45 monitors the battery cell 10, and determines a plurality of battery cell parameters 37. The reduced order electrochemical model 52 executes to determine a plurality of ROM internal variables 55 based upon the plurality of battery cell parameters 37 and the error term $Z_{target,error}$ 53 that is associated with the target parameter ($Z_{target}$) 34. The HGM 54 determines the electrochemical heat generation parameter 57 from the battery cell 10 based upon the plurality of ROM internal variables 55 and the error term $Z_{target,error}$ 53. The heat generation controller 56 determines a heat work parameter 59 based upon the error term $Z_{target,error}$ 53 and the plurality of ROM internal variables 55. The heat generation controller 56 communicates the heat work parameter 59 to the thermal management controller 25, which generates commands 26, 27 that are communicated to the first and second controllable heat exchangers 20, 30, respectively, to control operation thereof.

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which may be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The term "parameter" refers to a measurable quantity that represents a physical property of a device or other element that is discernible using one or more sensors and/or a physical model. A parameter can have a discrete value, e.g., either "1" or "0", or can be infinitely variable in value.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A control system for a battery cell, comprising:
   a heat exchanger in thermal contact with the battery cell, and a first controller;
   wherein the first controller is operatively connected to the heat exchanger;
   wherein the first controller is arranged to monitor the battery cell;
   wherein the first controller has executable code including a reduced order electrochemical model (ROM), a heat generation model, and a heat generation controller; and
   wherein the first controller includes an instruction set that is executable to:
   determine a target parameter for the battery cell,
   determine a plurality of battery cell parameters,
   determine, via the reduced order electrochemical model, a plurality of internal ROM variables based upon the plurality of battery cell parameters,
   determine, via the heat generation model, an electrochemical heat generation parameter from the battery cell based upon the plurality of internal ROM variables and the target parameter for the battery cell,
   determine, via the heat generation controller, a heat work parameter based upon the electrochemical heat generation and the target parameter for the battery cell, and
   control the heat exchanger based upon the heat work parameter.

2. The control system of claim 1, further comprising:
   wherein the first controller has executable code including a model parameter modification routine; and
   wherein the first controller includes an instruction set that is executable to update, via the model parameter modification routine, the plurality of battery cell parameters.

3. The control system of claim 1, wherein the heat exchanger in thermal contact with the battery cell comprises a thermoelectric heat pump device.

4. The control system of claim 1, wherein the battery cell comprises a rectangular prismatic device, and wherein the heat exchanger in thermal contact with the battery cell comprises a first thermoelectric heat pump device in thermal contact with a first side of the rectangular prismatic device and a second thermoelectric heat pump device in thermal contact with a second side of the rectangular prismatic device.

5. The control system of claim 1, wherein the target parameter for the battery cell comprises a target temperature value.

6. The control system of claim 1, wherein the target parameter for the battery cell comprises a target current value.

7. The control system of claim 1, wherein the target parameter for the battery cell comprises a target voltage value.

8. The control system of claim 1, wherein the instruction set is executable in real-time to determine, via the heat generation controller, the heat work parameter based upon the electrochemical heat generation and the target parameter for the battery cell and control the heat exchanger based upon the heat work parameter.

9. The control system of claim 1, wherein the first controller includes an instruction set that is executable to control the heat exchanger to control a temperature of the battery cell based upon the heat work parameter.

10. The control system of claim 1, further comprising a thermal management controller in communication with the first controller and operatively connected to the heat exchanger, wherein the first controller includes an instruction set that is executable to control the thermal management controller to operate the heat exchanger based upon the heat work parameter.

11. The control system of claim 1, wherein the battery cell comprises a rechargeable lithium-ion battery cell.

12. The control system of claim 1, wherein the battery cell comprises a plurality of battery cells that are electrically connected.

13. Method for controlling a heat exchanger in thermal contact with a battery cell, the method comprising:
- determining a target parameter for the battery cell;
- determining a plurality of battery cell parameters;
- determining, via a reduced order electrochemical model, a plurality of internal ROM variables based upon the plurality of battery cell parameters;
- determining, via a heat generation model, electrochemical heat generation from the battery cell based upon the plurality of internal ROM variables;
- determining, via a heat generation controller, a heat work parameter based upon the electrochemical heat generation and the target parameter for the battery cell; and
- controlling the heat exchanger based upon the heat work parameter.

14. The method of claim 13, wherein controlling the heat exchanger comprises controlling heat transfer between the heat exchanger and the battery cell based upon the heat work parameter.

15. The method of claim 13, further comprising updating, via a model parameter modification routine, the plurality of battery cell parameters.

16. The method of claim 13, wherein the target parameter for the battery cell comprises a target temperature value.

17. The method of claim 13, wherein the target parameter for the battery cell comprises a target current value.

18. The method of claim 13, wherein the target parameter for the battery cell comprises a target voltage value.

19. The method of claim 13, further comprising controlling the heat exchanger to control a temperature of the battery cell based upon the heat work parameter.

20. Method for controlling a parameter in a battery cell, the method comprising:
- determining a target temperature for the battery cell;
- determining a plurality of battery cell parameters;
- determining, via a reduced order electrochemical model (ROM), a plurality of internal ROM variables based upon the plurality of battery cell parameters;
- determining, via a heat generation model, electrochemical heat generation from the battery cell based upon the plurality of internal ROM variables;
- determining, via a heat generation controller, a heat work parameter based upon the electrochemical heat generation and the target temperature for the battery cell; and
- controlling a heat exchanger that is thermally coupled to the battery cell based upon the heat work parameter.

* * * * *